US010704194B2

(12) United States Patent
Chidate et al.

(10) Patent No.: US 10,704,194 B2
(45) Date of Patent: Jul. 7, 2020

(54) INK JET INK COMPOSITION FOR TEXTILE PRINTING AND INK JET TEXTILE PRINTING METHOD

(71) Applicant: Seiko Epson Corporation, Tokyo (JP)

(72) Inventors: Kosuke Chidate, Suwa (JP); Masakazu Ohashi, Shiojiri (JP); Hideki Okada, Shiojiri (JP); Takako Sugiyama, Azumino (JP); Hiromi Noguchi, Shiojiri (JP)

(73) Assignee: Seiko Epson Corporation (JP)

(*) Notice: Subject to any disclaimer, the term of this patent is extended or adjusted under 35 U.S.C. 154(b) by 167 days.

(21) Appl. No.: 15/909,286

(22) Filed: Mar. 1, 2018

(65) Prior Publication Data

US 2018/0282945 A1 Oct. 4, 2018

(30) Foreign Application Priority Data

Mar. 29, 2017 (JP) ................................ 2017-065773

(51) Int. Cl.

| | |
|---|---|
| ***C09D 11/322*** | (2014.01) |
| ***C09D 11/38*** | (2014.01) |
| ***D06P 5/30*** | (2006.01) |
| ***D06P 1/52*** | (2006.01) |
| ***D06P 1/54*** | (2006.01) |
| ***D06P 1/642*** | (2006.01) |
| ***D06P 1/645*** | (2006.01) |
| ***D06P 1/653*** | (2006.01) |
| ***D06P 1/673*** | (2006.01) |
| ***B41J 2/17*** | (2006.01) |

(52) U.S. Cl.
CPC . *D06P 5/30* (2013.01); *B41J 2/17* (2013.01); *D06P 1/5214* (2013.01); *D06P 1/54* (2013.01); *D06P 1/645* (2013.01); *D06P 1/6424* (2013.01); *D06P 1/653* (2013.01); *D06P 1/6735* (2013.01)

(58) Field of Classification Search
CPC ...................................................... C09D 11/30
See application file for complete search history.

(56) References Cited

U.S. PATENT DOCUMENTS

| | | | | |
|---|---|---|---|---|
| 5,902,387 | A * | 5/1999 | Suzuki | B41J 2/17503 106/31.27 |
| 2012/0306976 | A1 | 12/2012 | Kitagawa et al. | |
| 2014/0186533 | A1 | 7/2014 | Kitagawa et al. | |

FOREIGN PATENT DOCUMENTS

| | | | |
|---|---|---|---|
| JP | 2009-215506 | A | 9/2009 |
| JP | 2010-150453 | A | 7/2010 |
| WO | WO-2017-021273 | A1 | 2/2017 |

OTHER PUBLICATIONS

Extended European Search Report for Patent Application No. EP18162063.4, dated Aug. 29, 2018 (7 pages).

* cited by examiner

*Primary Examiner* — Helene Klemanski
(74) *Attorney, Agent, or Firm* — Harness, Dickey & Pierce, P.L.C.

(57) ABSTRACT

An ink jet ink composition for textile printing contains a crosslinking component having a blocked isocyanate group, tertiary amine, at least one carboxylic acid selected from the group consisting of monocarboxylic acid, dicarboxylic acid, and tricarboxylic acid, a pigment, and water.

19 Claims, 1 Drawing Sheet

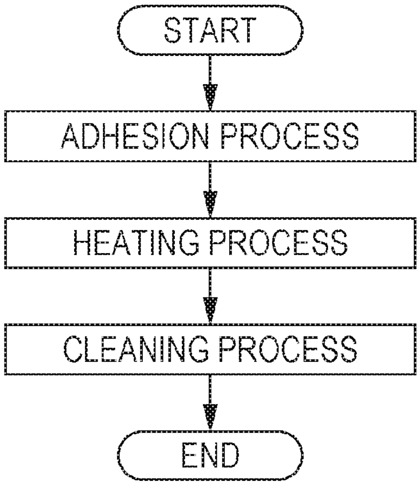
START
ADHESION PROCESS
HEATING PROCESS
CLEANING PROCESS
END

INK JET INK COMPOSITION FOR TEXTILE PRINTING AND INK JET TEXTILE PRINTING METHOD

BACKGROUND

1. Technical Field

The present invention relates to an ink jet ink composition for textile printing and an ink jet textile printing method.

2. Related Art

An ink jet recording method enables recording of a high definition image with a relatively simple apparatus and has rapidly developed in various fields. In the development, various examinations have been made also for an ink jet textile printing method for use in fabric.

For example, JP-A-2009-215506 discloses that a textile printing ink jet ink containing a pigment, a water-dispersible resin having a specific coating film elongation and tensile strength, a blocked isocyanate compound (crosslinking agent), and water at a predetermined ratio can form a strong ink film on recorded matter to improve the washing fastness and the rubbing fastness of the ink film.

In usual, it is considered to use a blocked isocyanate compound as a crosslinking agent in order to improve fastness performance as in JP-A-2009-215506. On the other hand, the present inventors have found that, when an ink containing the blocked isocyanate compound as a crosslinking agent is stored over a long period of time, a blocked isocyanate group of the blocked isocyanate compound is decomposed, so that the fastness performance of the ink tends to decrease. Further, when the blocked isocyanate compound is contained, clogging tends to be likely to occur in a discharge nozzle. Then, the present inventors have conducted an extensive examination in order to improve the clogging of the discharge nozzle. As a result, the present inventors have found that, when tertiary amine is contained in the ink containing the blocked isocyanate compound, the clogging of the discharge nozzle can be improved. However, it has been clarified that, when the ink contains tertiary amine, the decomposition of the blocked isocyanate group is promoted.

SUMMARY

An advantage of some aspects of the invention is to provide an ink jet ink composition for textile printing and an ink jet textile printing method which satisfy both an improvement of fastness performance in the initial stage and after the lapse of time and an improvement of clogging performance.

The present inventors have conducted an extensive examination in order to solve the above-described problems. As a result, the present inventors have found that, when an ink jet ink composition for textile printing contains a crosslinking component having a blocked isocyanate group, tertiary amine, a specific carboxylic acid, a pigment, and water, both an improvement of fastness performance in the initial stage and after the lapse of time and an improvement of clogging performance are satisfied, and then have completed the invention.

More specifically, an ink jet ink composition for textile printing according to an aspect of the invention (hereinafter also referred to as "ink composition") contains a crosslinking component having a blocked isocyanate group (hereinafter also referred to as "specific crosslinking component"), tertiary amine, at least one carboxylic acid (hereinafter also referred to as "specific carboxylic acid") selected from the group consisting of monocarboxylic acid, dicarboxylic acid, and tricarboxylic acid, a pigment, and water. A factor that such an ink composition can solve the problems to be solved of the invention is considered as follows. However, the factor is not limited thereto. More specifically, mainly because the ink composition contains the specific crosslinking component, the fastness performance in the initial stage is improved. Moreover, mainly because the ink composition contains the tertiary amine, clogging of a discharge nozzle discharging the ink composition is improved. Furthermore, mainly because the ink composition contains the specific carboxylic acid, the decomposition of the blocked isocyanate group of the specific crosslinking component is suppressed and the excellent fastness performance in the initial stage can be maintained also after the lapse of time.

It is preferable for the ink jet ink composition for textile printing according to the aspect of the invention to further contain resin particles. Moreover, it is preferable for the ink jet ink composition for textile printing to further contain an inorganic base. It is preferable that the inorganic base is potassium hydroxide. It is preferable that the content of the inorganic base is 0.01% by mass or more and 0.1% by mass or less based on the ink composition. Moreover, it is preferable that the content of the crosslinking component is 1.0% by mass or more and 2.5% by mass or less based on the ink composition. Moreover, it is preferable that the tertiary amine is alkanolamine. It is preferable that the content of the tertiary amine is 0.5% by mass or more and 1.5% by mass or less based on the ink composition. It is preferable that the carboxylic acid is carboxylic acid having a pKa value of 4.0 or more. It is preferable that the carboxylic acid is adipic acid. It is preferable that the content of the carboxylic acid is 0.05% by mass or more and 0.15% by mass or less based on the ink composition. It is preferable that the pH of the ink jet ink composition for textile printing is 7.5 or more and 9.5 or less. It is preferable that the crosslinking component is a low molecular weight crosslinking component.

An ink jet textile printing method according to another aspect of the invention includes discharging the ink jet ink composition for textile printing according to the above aspect of the invention from an ink jet apparatus to cause the ink jet ink composition to adhere onto a target recording medium containing at least fabric.

BRIEF DESCRIPTION OF THE DRAWINGS

The invention will be described with reference to the accompanying drawing, wherein like numbers reference like elements.

FIGURE is a flow chart illustrating an example of a textile printing method of this embodiment.

DESCRIPTION OF EXEMPLARY EMBODIMENTS

Hereinafter, an embodiment of the invention (hereinafter referred to as "this embodiment") is described in detail with reference to the drawing as necessary, but the invention is not limited thereto and can be variously modified without deviating from the scope.

In this specification, "textile printing" refers to recording by an ink composition performed on a target recording medium containing at least fabric. A "textile printed product" refers to a product in which recording is performed, with an ink composition, on a target recording medium containing at least fabric and an image is formed on the target recording medium.

In this specification, the "fastness performance" refers to the performance of ruggedizing a textile printed product and the "fastness performance" contains rubbing fastness performance, for example. The "fastness performance in the initial stage" refers to the fastness performance when using a substance immediately after being prepared as an ink composition and the "fastness performance after the lapse of time" refers to the fastness performance when using a substance after the lapse of 30 days after being prepared as an ink composition, and then heated at 40° C. The "clogging performance" refers to the performance that clogging is not easily occurred in a discharge nozzle when discharging an ink composition. The "dispersion stability" refers to the performance that, when 30 days has passed after preparing an ink composition, and then heating the same at 40° C., pigment particles are not easily aggregated.

Ink Composition

The ink composition of this embodiment contains a crosslinking component having a blocked isocyanate group (hereinafter also referred to as "specific crosslinking component"), tertiary amine, at least one carboxylic acid (hereinafter also referred to as "specific carboxylic acid") selected from the group consisting of monocarboxylic acid, dicarboxylic acid, and tricarboxylic acid, a pigment, and water. A factor that such an ink composition is excellent in fastness performance in the initial stage and after the lapse of time and clogging performance is considered as follows. However, the factor is not limited thereto. More specifically, mainly because the ink composition of this embodiment contains the specific crosslinking component, the fastness performance in the initial stage improves. On the other hand, when the specific crosslinking component is contained, clogging of a discharge nozzle discharging the ink composition tends to occur. However, the ink composition of this embodiment can improve the clogging of the discharge nozzle mainly because containing tertiary amine. Herein, when the tertiary amine is contained, the decomposition of the blocked isocyanate group of the specific crosslinking component is promoted, so that the fastness performance after the lapse of time tends to be poor. However, the ink composition of this embodiment contains the specific carboxylic acid, and therefore the decomposition of the blocked isocyanate group of the specific crosslinking component is suppressed, so that the excellent fastness performance in the initial stage can be maintained also after the lapse of time.

Specific Crosslinking Component

The specific crosslinking component of this embodiment is a component having a blocked isocyanate group in which the isocyanate group is protected by a blocking agent. The ink composition of this embodiment has excellent fastness performance mainly because of containing the specific crosslinking component. It is considered that a factor therefor lies in an active isocyanate group, which is reproduced through dissociation of the blocking agent mainly by heat treatment, and an active hydrogen portion on fabric reacting with each other to form a crosslinking structure, but the factor is not limited thereto.

Examples of the blocking agent include, but are not particularly limited to, an alcohol compound, an amine compound, an imide compound, an imine compound, a urea compound, a mercaptan compound, a diaryl compound, a phenol compound, an active methylene compound, an oxime compound, and a lactam compound, for example. These blocking agents can be used as appropriate according to a desired dissociation temperature (for example, 100 to 180° C.)

The specific crosslinking component may be a low molecular weight component (for example, isocyanates in which an isocyanate group is protected by a blocking agent and a urethane polymer in which an isocyanate group is protected by a blocking agent) or may be a high molecular weight component (for example, a urethane-based resin in which an isocyanate group is protected by a blocking agent). From the viewpoint of more effectively and certainly demonstrating the operational effects of the invention, the low molecular weight components are preferable and the isocyanates in which the isocyanate group is protected by a blocking agent (hereinafter also referred to as "blocked isocyanates") are more preferable. Herein, when the specific crosslinking component is the low molecular weight component, the mass average molecular weight (Weight average molecular weight) is preferably 500 or less in terms of polystyrene and may be a mass average molecular weight (Weight average molecular weight) comparable to that of the blocked isocyanate described later. Herein, the "comparable" refers to a numerical value within the range of ±3%.

The number of the isocyanate groups protected by the blocking agent in the blocked isocyanate may be one or two or more and is preferably two or more and more preferably two from the viewpoint of more effectively and certainly demonstrating the operational effects of the invention.

Examples of the blocked isocyanates include, but are not particularly limited to, aliphatic blocked isocyanates in which isocyanates are aliphatic isocyanates and aromatic blocked isocyanates in which isocyanates are aromatic isocyanates, for example.

Examples of the aliphatic isocyanates include $C_{1-12}$ alkyl or cycloalkyl (where 1-12 includes both the number of ring carbon atoms and the carbon atoms of alkyl substituents on the ring) substituted with 1-4, more usually 2 or 3, isocyanate groups and optionally having one or more further substituents selected from C(O)OH, C(O)O$C_{1-6}$ alkyl, OH and O$C_{1-6}$ alkyl. Aliphatic diisocyanates and aliphatic triisocyanates are particularly suitable. Examples of the aliphatic diisocyanate include, but are not particularly limited to, hexamethylene-1,6-diisocyanate (HDI), decamethylene diisocyanate, 2,2,4-trimethylhexamethylene-1,4-diisocyanate, lysine diisocyanate, and isophorone diisocyanate (IPDI). Examples of the aliphatic triisocyanate include, but are not particularly limited to, 1,3,6-hexamethylene triisocyanate, for example.

Examples of the aromatic isocyanates include phenyl or napthyl substituted with 1-4, more usually 2 or 3, isocyanate groups and optionally having one or more further substituents selected from $C_{1-6}$ alkyl, $C_{1-6}$ alkyl-O—$C_{1-6}$ alkyl and $C_{1-6}$ haloalkyl; or a $C_{1-3}$ alkyl group substituted with one or more phenyl or napthyl groups, wherein each phenyl or naphthyl group is substituted with 1-4, more usually 2 or 3, isocyanate groups and optionally has one or more further substituents selected from $C_{1-6}$ alkyl, $C_{1-6}$ alkyl-O—$C_{1-6}$ alkyl and $C_{1-6}$ haloalkyl substituted as defined above. Particularly suitable aromatic isocyanates include methyl substituted with 2 or 3 such aromatic groups as described above. More specific examples of aromatic isocyanates include aromatic diisocyanate and aromatic triisocyanate. Examples of the aromatic diisocyanate include, but are not particularly limited to, diphenylmethane-4,4'-diisocyanate (MDI), p-phenylene diisocyanate, 2,4-tolylene diisocyanate (2,4-TDI), 2,6-tolylene diisocyanate (2,6-TDI), and 1,5-naphthalene diisocyanate. Examples of the aromatic triisocyanate include, but are not particularly limited to, triphenylmethane triisocyanate, for example.

The blocked isocyanates may be prepared according to known methods or commercially-available items may be used. Examples of the commercially-available items include, for example, HDI type blocked isocyanates such as NBP-8730, NBP-211, Meikanate CX, SU-268A; MDI type blocked isocyanates such as DM-6400, Meikanate DM-3031CONC, Meikanate DM-35HC; TDI type blocked isocyanates such as Meikanate TP-10; all manufactured by MEISEI CHEMICAL WORKS. LTD., (all Trade Names).

The blocked isocyanates are used alone or in combination of two or more thereof.

Among the blocked isocyanates, from the viewpoint of more effectively and certainly demonstrating the operational effects of the invention, the aliphatic blocked isocyanates in which isocyanates are aliphatic isocyanates are preferable, the aliphatic blocked diisocyanates in which isocyanates are aliphatic diisocyanates are more preferable, and the blocked hexamethylene-1,6-diisocyanate in which isocyanate is hexamethylene-1,6-diisocyanate is still more preferable.

The content of the specific crosslinking component is preferably 1.0% by mass or more and 2.5% by mass or less, more preferably 1.2% by mass or more and 2.3% by mass or less, and still more preferably 1.5% by mass or more and 2.0% by mass or less based on the entire (100% by mass) ink composition. When the content of the specific crosslinking component is 1.0% by mass or more, the fastness performance in the initial stage of the ink composition can be further improved and, when the content is 2.5% by mass or less, the clogging performance can be further improved.

Tertiary Amine

The ink composition of this embodiment can improve clogging performance mainly due to containing tertiary amine. Moreover, because tertiary amine is used, the buffering capacity is higher and the pH change to the addition amount is smaller than those of primary or secondary amine. Furthermore, because tertiary amine is used, it can be realized that the decomposition of the blocked isocyanate group of the specific crosslinking component does not easily progress as compared with primary or secondary amine.

Examples of the tertiary amine include, but are not particularly limited to, tertiary amines represented by $R^1$—N($R^2$)—$R^3$: (In the formula, $R^1$, $R^2$, and $R^3$ each independently represent a linear or branched alkyl group, hydroxyalkyl group, or alkoxy group having 1 to 10 carbon atoms, for example.).

The number of carbon atoms of $R^1$, $R^2$, and $R^3$ is preferably 1 to 6, and more preferably 1 to 4 from the viewpoint of more effectively and certainly demonstrating the operational effects of the invention.

$R^1$, $R^2$, and $R^3$ may or may not have a substituent (for example, halogen atom) insofar as the operational effects of the invention are not impaired.

Specific examples of tertiary amines (trialkylamine) in which $R^1$, $R^2$, and $R^3$ in the formula are linear or branched alkyl groups include trimethylamine, triethylamine, tri-n-butylamine, diisopropylethylamine, diethyl-n-butylamine, methyl-di-n-butylamine, and methylethyl-n-butylamine.

Specific examples of tertiary amines (N,N-dialkyl alkanolamine) in which, in the formula, $R^1$ and $R^2$ are linear or branched alkyl groups and $R^3$ is a linear or branched hydroxyalkyl group include N,N-dimethylethanolamine, N,N-diethylethanolamine, N,N-dipropylethanolamine and N,N-dibutylethanolamine.

Specific examples of tertiary amines (N-alkyl dialkanolamine) in which, in the formula, $R^1$ is a linear or branched alkyl group and $R^2$ and $R^3$ are linear or branched hydroxyalkyl groups include, for example, N-methyldiethanolamine, N-propyldiethanolamine, N-butyldiethanolamine, and N-methyldipropanolamine.

Specific examples of tertiary amine (trialkanolamine) in which $R^1$, $R^2$, and $R^3$ in the formula are linear or branched alkoxy groups include triethanolamine, tripropanolamine, triisopropanolamine, and tributanolamine.

These tertiary amines are used alone or in combination of two or more thereof.

The tertiary amine is preferably alkanolamine, and more preferably triethanolamine and triisopropanolamine from the viewpoint of more excellent dispersion stability.

The content of the tertiary amine is preferably 0.5% by mass or more and 1.5% by mass or less, more preferably 0.6% by mass or more and 1.4% by mass or less, and still more preferably 0.8% by mass or more and 1.2% by mass or less based on the entire (100% by mass) ink composition. When the content of the tertiary amine is 0.5% by mass or more, the clogging performance can be further improved, and when the content of the tertiary amine is 1.5% by mass or less, the fastness performance after the lapse of time of the ink composition can be further improved.

Specific Carboxylic Acid

The specific carboxylic acid is at least one carboxylic acid selected from the group consisting of monocarboxylic acid, dicarboxylic acid, and tricarboxylic acid. The ink composition of this embodiment can maintain the excellent fastness performance in the initial stage also after the lapse of time by containing the specific carboxylic acid. A factor therefor is considered as follows. However, the factor is not limited thereto. More specifically, first, when the ink composition contains a weakly basic tertiary amine, the balance between a hydrogen ion and a hydroxide ion in the ink composition is lost, so that the blocked isocyanate group of the specific crosslinking component tends to be easily decomposed. On the other hand, when a weakly basic tertiary amine and a specific weakly acidic carboxylic acid are combined, the tertiary amine and the specific carboxylic acid cause a neutralization reaction, and therefore the buffering action works, so that the balance between the hydrogen ion and the hydroxide ion in the ink composition tends to be maintained. Therefore, it is considered that the decomposition of the blocked isocyanate group is suppressed.

Examples of the specific carboxylic acid include, but are not particularly limited to, saturated aliphatic mono- to tri-carboxylic acids (saturated aliphatic monocarboxylic acid, saturated aliphatic dicarboxylic acid, and saturated aliphatic tricarboxylic acid), unsaturated aliphatic mono- to tri-carboxylic acids (unsaturated aliphatic monocarboxylic acid, unsaturated aliphatic dicarboxylic acid, and unsaturated aliphatic tricarboxylic acid), and aromatic mono- to tri-carboxylic acids (aromatic monocarboxylic acid, aromatic dicarboxylic acid, and aromatic tricarboxylic acid), for example.

Examples of the saturated aliphatic mono- to tri-carboxylic acids include, but are not particularly limited to, saturated aliphatic mono- to tri-carboxylic acids having 1 to 20 carbon atoms, for example. Specific examples of the saturated aliphatic monocarboxylic acid include formic acid, acetic acid, propionic acid, butyric acid, caprylic acid, caproic acid, hexanoic acid, capric acid, lauric acid, myristic acid, and pulmitic acid. Specific examples of the saturated aliphatic dicarboxylic acid include oxalic acid, malonic acid, succinic acid, glutaric acid, adipic acid, pimelic acid, suberic acid, azelaic acid, and sebacic acid. Specific examples of the saturated aliphatic tricarboxylic acid include 1,2,3-propane tricarboxylic acid (tricarballylic acid), 1,3,5-pentane tricarboxylic acid, citric acid, and isocitric acid.

Examples of the unsaturated aliphatic mono- to tri-carboxylic acids include, but are not particularly limited to, unsaturated aliphatic mono- to tri-carboxylic acids having 2 to 20 carbon atoms, for example. Specific examples of the unsaturated aliphatic mono- to tri-carboxylic acids include crotonic acid, α-methyl crotonic acid, α-ethyl crotonic acid, isocrotonic acid, fumaric acid, maleic acid, citraconic acid, glutaconic acid, and itaconic acid, for example.

Specific examples of the aromatic mono- to tri-carboxylic acids include benzoic acid including methylbenzoic acid, dimethylbenzoic acid, trimethyl benzoic acid, and isopropyl benzoic acid, for example.

These specific carboxylic acids are used alone or in combination of two or more thereof.

Among these specific carboxylic acids, from the viewpoint of further improving the fastness performance after the lapse of time and the dispersion stability, carboxylic acid having a pKa value of 4.0 or more is preferable, carboxylic acid having a pKa value of 4.2 or more is more preferable, and carboxylic acid having a pKa value of 4.4 or more is still more preferable. On the other hand, from the viewpoint of further improving the dispersion stability, carboxylic acid having a pKa value of 5.0 or less is preferable, carboxylic acid having a pKa value of 4.8 or less is more preferable, and carboxylic acid having a pKa value of 4.6 or less is still more preferable. The acid dissociation constant as used in this specification means a first acid dissociation constant in the case of dicarboxylic acid and tricarboxylic acid containing two or more carboxy groups.

The specific carboxylic acid is preferably dicarboxylic acid, more preferably saturated aliphatic dicarboxylic acid, still more preferably saturated aliphatic dicarboxylic acid having 4 to 10 carbon atoms, and particularly preferably adipic acid from the viewpoint of further improving the fastness performance after the lapse of time and the dispersion stability with good balance.

The content of the carboxylic acid is preferably 0.05% by mass or more and 0.15% by mass or less, more preferably 0.06% by mass or more and 0.09% by mass or less, and still more preferably 0.07% by mass or more and 0.08% by mass or less based on the entire (100% by mass) ink composition. When the content of the carboxylic acid is 0.05% by mass or more, the fastness performance after the lapse of time and the dispersion stability of the ink composition can be further improved and, when the content of the carboxylic acid is 0.15% by mass or less, the clogging performance can be further improved.

Pigment

Examples of the pigment of this embodiment include, but are not particularly limited to, the following substances, for example.

Examples of carbon black to be used in a black ink include, but are not particularly limited to, No. 2300, No. 900, MCF88, No. 33, No. 40, No. 45, No. 52, MA7, MA8, MA100, No. 2200B, and the like (all manufactured by Mitsubishi Chemical Corporation), Raven 5750, Raven 5250, Raven 5000, Raven 3500, Raven 1255, Raven 700, and the like (all manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K.K.), Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (all manufactured by Degussa), for example.

Examples of pigments to be used in a white ink include, but are not particularly limited to, C.I. Pigment White 6, 18, and 21, titanium oxide, zinc oxide, zinc sulfide, antimony oxide, zirconium dioxide, and white hollow resin particles and polymer particles, for example.

Examples of pigments to be used in a yellow ink include, but are not particularly limited to, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180, for example.

Examples of pigments to be used in a magenta ink include, but are not particularly limited to, C.I. Pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50, for example.

Examples of pigments to be used in a cyan ink include, but are not particularly limited to, C.I. Pigment Blue 1, 2, 3, 15, 15:1, 15:2, 15:3, 15:34, 15:4, 16, 18, 22, 25, 60, 65, 66, and C.I. Vat Blue 4 and 60, for example.

Examples of pigments other than the pigments mentioned above include, but are not particularly limited to, C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63, for example.

The average particle diameter of the pigments is preferably 50 nm or more and 300 nm or less, more preferably 55 nm or more and 200 nm or less, still more preferably 60 nm or more and 150 nm or less, and yet still more preferably 65 nm or more and 100 nm or less, from the viewpoint of more effectively and certainly demonstrating the operational effects of the invention. The average particle diameter in this specification is on a volume basis unless otherwise particularly specified. As a measuring method, the average particle diameter can be measured with a particle size distribution meter employing a laser diffraction scattering method as the measurement principle, for example. As the particle size distribution meter, a particle size distribution meter (for example, Microtrac UPA manufactured by Nikkiso Co., Ltd.) employing a dynamic light scattering method as the measurement principle is mentioned, for example.

In the ink composition, the content of the pigments is preferably 1.0% by mass or more and 15% by mass or less, more preferably 2.0% by mass or more and 10% by mass or less, and still more preferably 3.0% by mass or more and 7.0% by mass or less based on the entire (100% by mass) ink composition from the viewpoint of more effectively and certainly demonstrating the operational effects of the invention.

Water

The ink composition of this embodiment contains water. Examples of water include pure water, such as ion exchanged water, ultrafiltration water, reverse osmosis water, and distilled water, and ultrapure water in which ionic impurities are removed as much as possible, for example.

Resin Particles

It is preferable for the ink composition of this embodiment to further contain resin particles. The resin particles (hereinafter also referred to as "resin dispersion" and "resin emulsion") are particles containing resin. The ink composition of this embodiment contains the resin particles, and therefore the fastness of a textile printed product tends to be further improved. A factor therefor is considered as follows. However, the factor is not limited thereto. More specifically, it is considered that, when the ink composition is caused to adhere to fabric, a resin coating is formed on the fabric and the resin and the pigment are fused, so that the pigment can be caused to firmly adhere to the fabric, and therefore the fastness of the textile printed product is further improved.

The resin particles of this embodiment may be resin particles of a self-dispersion type (self-dispersion type resin particles) into which a hydrophilic component required in order to be stably dispersed in water is introduced or may be resin particles which become water dispersible by the use of an external emulsifier.

Examples of the resin include a urethane-based resin, a (meth)acrylic resin, and a styrene (meth)acrylic resin, for example. The resin is used alone or in combination of two or more thereof. The "(meth)acrylic" as used in this specification means both acrylic and methacrylic corresponding thereto.

Among the above, the urethane-based resin is preferable from the viewpoint that the fastness performance in the initial stage is further excellent. It is considered that a factor therefor mainly lies in, when the specific crosslinking component and the urethane-based resin are combined, an active isocyanate group of the specific crosslinking component reproduced by heat treatment and the isocyanate group of the urethane-based resin reacting with each other to form a crosslinking structure, but the factor is not limited thereto.

Examples of the urethane-based resin include a polyether type urethane resin containing an ether bond in the main chain, a polyester type urethane resin containing an ester bond in the main chain, and a polycarbonate type urethane resin containing a carbonate bond in the main chain, besides a urethane bond. The urethane resin is used alone or in combination of two or more thereof.

Examples of commercially-available items of the urethane-based resin include UW-1501F and UW-5002 (all Trade Names, manufactured by Ube Industries, Ltd.), TAKELAC W-6061, W-6110, and WS6021 (all Trade Names, manufactured by Mitsui Chemicals, Inc.), UX-150, UX-390, and UX-200 (all Trade Names, manufactured by Sanyo Chemical Industries, Ltd.).

The average particle diameter of the resin particles is preferably 50 nm or more and 300 nm or less, more preferably 55 nm or more and 200 nm or less, still more preferably 60 nm or more and 150 nm or less, and yet still more preferably 65 nm or more and 100 nm or less from the viewpoint of more effectively and certainly demonstrating the operational effects of the invention. The average particle diameter of the resin particles can be measured by the measuring method described as an example of the measuring method of the average particle diameter of the pigment, for example.

In the ink composition, the content (in terms of solid content) of the resin particles is preferably 1.0% by mass or more and 20% by mass or less, more preferably 2.0% by mass or more and 15% by mass or less, and still more preferably 3.0% by mass or more and 10% by mass or less based on the entire (100% by mass) ink composition from the viewpoint of more effectively and certainly demonstrating the operational effects of the invention.

Inorganic Base

It is preferable for the ink composition of the embodiment of this application to further contain an inorganic base from the viewpoint of further improving the clogging performance while suppressing an increase in viscosity.

Examples of the inorganic base include, but are not particularly limited to, metal carbonates (for example, sodium carbonate and sodium hydrogencarbonate), metal hydroxides, and ammonia, for example. These inorganic bases are used alone or in combination of two or more thereof. Among the above, the metal hydroxides are preferable from the viewpoint of more effectively and certainly demonstrating the operational effects of the invention.

Examples of the metal hydroxides include, but are not particularly limited to, sodium hydroxide, potassium hydroxide, and calcium hydroxide, for example. Among the above, the potassium hydroxide is preferable from the viewpoint of more effectively and certainly demonstrating the operational effects of the invention.

The content of the inorganic base (for example, potassium hydroxide) is preferably 0.01% by mass or more and 0.1% by mass or less, more preferably 0.02% by mass or more and 0.09% by mass or less, and still more preferably 0.03% by mass or more and 0.08% by mass or less based on the entire (100% by mass) ink composition. The content of the inorganic base is 0.01% by mass or more, and therefore the clogging performance can be further improved. The content of the inorganic base is 0.1% by mass or less, and therefore the fastness performance after the lapse of time can be further improved.

Inorganic Acid

The ink composition of this embodiment may or may not contain inorganic acid (for example, hydrochloric acid). The content of the inorganic acid is preferably 0.05% by mass or less and more preferably 0.01% by mass or less based on the entire (100% by mass) ink composition and, still more preferably, no inorganic acids are contained from the viewpoint of more effectively and certainly demonstrating the operational effects of the invention.

Water-Soluble Organic Solvent

The ink composition of this embodiment can further contain a water-soluble organic solvent which can be dissolved in water from the viewpoint of viscosity control and a moisturizing effect.

Examples of the water-soluble organic solvent include, but are not particularly limited to, lower alcohols (for example, methanol, ethanol, 1-propanol, isopropanol, 1-butanol, 2-butanol, isobutanol, and 2-methyl-2-propanol), glycols (for example, ethylene glycol, diethylene glycol, triethylene glycol, tetraethylene glycol, pentaethylene glycol, propylene glycol, dipropylene glycol, and tripropylene glycol), glycerol, acetins (for example, monoacetin, diacetin, and triacetin), derivatives of glycols (for example, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, and tetraethylene glycol diethylether), 1-methyl-2-pyrrolidone, β-thiodiglycol, and sulfolane, for example. These water-soluble organic solvents are used alone or in combination of two or more thereof.

The content of the organic solvent is preferably 1.0% by mass or more and 50% by mass or less, more preferably 5.0% by mass or more and 40% by mass or less, and still more preferably 10% by mass or more and 30% by mass or less based on the entire (100% by mass) ink composition from the viewpoint of more effectively and certainly demonstrating the operational effects of the invention.

Surfactant

It is preferable for the ink composition to further contain a surfactant from the viewpoint that the ink composition can be stably discharged by an ink jet system and the permeation of the ink composition can be appropriately controlled. Examples of the surfactant include, but are not particularly limited to, acetylene glycol-based surfactants (for example, 2,4,7,9-tetramethyl-5-decyne-4,7-diol and an alkylene oxide adduct of 2,4,7,9-tetramethyl-5-decyne-4,7-diol and 2,4-dimethyl-5-decyne-4-ol and an alkylene oxide adduct of 2,4-dimethyl-5-decyne-4-ol), fluorine based surfactants (for example, perfluoroalkyl sulfonate, a perfluoroalkyl carboxylate salt, perfluoroalkyl phosphate ester, a perfluoroalkyl ethylene oxide adduct, perfluoroalkyl betaine, and a perfluoroalkyl amine oxide compound), and silicone-based surfactants (for example, a polysiloxane-based compound and polyether-modified organosiloxane), for example.

The content of the surfactant is preferably 0.1% by mass or more and 5.0% by mass or less, more preferably 0.5% by mass or more and 4.0% by mass or less, and still more preferably 1.0% by mass or more and 3% by mass or less based on the total amount (100% by mass) of the ink composition from the viewpoint of more effectively and certainly demonstrating the operational effects of the invention.

The ink composition can also contain, as appropriate, various additives, such as a softening agent, wax, a dissolution assistant, a viscosity control agent, an antioxidant, an antifungal/antiseptic agent, an antifungal agent, a corrosion inhibitor, and a chelating agent (for example, sodium ethylenediamine tetraacetate) for capturing metal ions affecting dispersion as other additives.

Physical Properties of Ink Composition

The pH of the ink composition of this embodiment is preferably 7.5 or more and 9.5 or less, more preferably 7.5 or more and 9.3 or less, still more preferably 7.8 or more and 9.2 or less, and yet still more preferably 8.0 or more and 9.0 or less from the viewpoint of improving the fastness performance in the initial stage and after the lapse of time, the clogging performance, and the dispersion stability with good balance. When the pH is 7.8 or more, the dispersion stability tends to be more certainly improved and, when the pH is 9.3 or less, the fastness performance after the lapse of time tends to be more certainly improved.

Target Recording Medium

The target recording medium of this embodiment may be one containing fabric (including fabric itself). Examples of the fabric include, but are not limited to the following substances, natural fibers and synthetic fibers, such as silk, cotton, and wool, and nylon, polyester, and rayon, respectively. The fabric may be one containing one fiber or may be one obtained by blending two or more fibers. Among the above, by the use of one obtained by blending fibers different in permeability, there is a tendency that the effects of this embodiment are likely to be obtained. The fabric may be one obtained by forming the fibers mentioned above into forms, such as textiles, knit fabric, and nonwoven fabric.

Ink Jet Textile Printing Method

An ink jet textile printing method of this embodiment has an adhesion process of discharging the ink composition of this embodiment, and then causing the same to adhere to a target recording medium containing at least fabric. FIGURE is a flow chart illustrating an example of the textile printing method of this embodiment. As illustrated in FIGURE, the textile printing method of this embodiment may further have the following heating process and cleaning process in addition to the adhesion process.

The ink jet textile printing method is a textile printing method in which the ink composition is used by being charged into an ink jet apparatus. Examples of the ink jet apparatus include, but are not particularly limited to, a drop-on-demand type ink jet apparatus, for example. Examples of the drop-on-demand type ink jet apparatus include an apparatus employing an ink jet textile printing method using a piezoelectric element disposed in a head, an apparatus employing an ink jet textile printing method using thermal energy by a heater and the like of a heating resistance element disposed in a head, and the like and an apparatus employing any ink jet textile printing method may be used. Hereinafter, each process of the ink jet textile printing method is described in detail.

Adhesion Process

The adhesion process of this embodiment includes discharging the ink composition towards the surface (image formation region) of a target recording medium containing fabric, for example, by an ink jet system, and then causing the ink composition to adhere to the target recording medium to form an image, for example. The discharge conditions may be determined as appropriate depending on the physical properties of the ink composition to be discharged.

Heating Process

The textile printing method of this embodiment may further have a heating process of heating the target recording medium to which the ink composition adheres after the adhesion process. The heating process is included, and therefore a pigment can be more favorably fixed to fibers configuring the fabric. Examples of heating methods include, but are not particularly limited to, a high temperature steaming method (HT method), a high-pressure steaming method (HP method), and a thermosol method, for example.

In the heating process, pressurization treatment may be or may not be performed to the ink composition adhesion surface on the target recording medium. Examples of heating methods not performing pressurization treatment to the ink composition adhesion surface on the target recording medium include oven drying (methods not performing press, such as a conveyor oven, a batch oven, and the like). Such a heating process is included, and therefore the recorded matter productivity further improves. Examples of heating methods performing pressurization treatment to the ink composition adhesion surface on the target recording medium include, but are not particularly limited to, heat press and wet-on-dry, for example. The “pressurization” refers to applying pressure to the target recording medium by bringing a solid into contact with the target recording medium.

The temperature in the heat treatment is preferably 100° C. or more and 180° C. or less, more preferably 130° C. or more and 175° C. or less, and still more preferably 150° C. or more and 170° C. or less from the viewpoint of more effectively and certainly demonstrating the operational effects of the invention.

Cleaning Process

The textile printing method of this embodiment may further have a cleaning process of cleaning the target recording medium to which the ink composition adheres after the heating process. By the cleaning process, the pigments not dyeing the fibers can be effectively removed. The cleaning process can be performed using water, for example, and soaping treatment may be performed as necessary. A soaping treatment method is not particularly limited, and more specifically, a method including washing out non-adhering pigments with a hot soap liquid or the like is mentioned, for example.

Thus, recorded matter, such as a textile printed product, in which an image originating from the ink composition is formed on the target recording medium containing fabric, can be obtained.

This embodiment can provide an ink jet ink composition for textile printing and an ink jet textile printing method which satisfy both an improvement of the fastness performance in the initial stage and after the lapse of time and an improvement of clogging performance.

EXAMPLES

Hereinafter, the invention is more specifically described with reference to Examples. The invention is not limited at all by the following examples.

Materials for Ink Compositions

Main materials for ink compositions used in the production of the following textile printed products are as follows.

Specific Crosslinking Component

NBP-8730 (manufactured by MEISEI CHEMICAL WORKS. LTD., aliphatic blocked isocyanates)

Tertiary Amine

Triethanolamine (hereinafter abbreviated as "TEA")
Triisopropanolamine (hereinafter abbreviated as "TIPA")
Triethylamine Specific Carboxylic Acid Adipic acid (pKa=4.42, dicarboxylic acid)
Citric acid (pKa=3.09, tricarboxylic acid)
Tricarballylic acid (pKa=3.59, tricarboxylic acid)
Acetic acid (pKa=4.76, monocarboxylic acid)

Pigment

C.I. Pigment Blue 15:3 (cyan pigment)

Resin Particles

TAKELAC W-6110 (manufactured by Mitsui Chemicals, Inc., anionic urethane resin emulsion)

Inorganic Base

Potassium hydroxide (KOH)

Water-Soluble Organic Solvent

Glycerol
Ethylene glycol

Surfactant

BYK-348 (Trade Name manufactured by BYK, polysiloxane-based surfactant)

Inorganic Acid

35% hydrochloric acid

Water

Pure water

Preparation of Ink Composition

Materials were mixed according to the compositions shown in the following Tables 1 to 3, and then sufficiently stirred to give each ink composition. In the following Tables 1 to 3, the unit of the numerical value is percent by mass and the total is 100.0% by mass. The content of resin particles and a crosslinking component is a value in terms of solid content in Tables 1 to 3.

Clogging Performance Evaluation

Each ink composition prepared above was charged into an ink cartridge of an ink jet printer (manufactured by Seiko Epson Corp., Product Name "PX-G930"), and then continuously discharged from all the nozzles for 3 minutes. After the discharge, the ink jet printer was allowed to stand at normal temperature. After the lapse of predetermined time, discharge from all the nozzles was performed again. The clogging performance was evaluated according to the following evaluation criteria. The results are shown in Tables 1 to 3.

S: Even after allowed to stand for two weeks at normal temperature, no nozzles were clogged.

A: When allowed to stand for two weeks at normal temperature, clogging occurred but the clogging was eliminated by cleaning.

B: When allowed to stand for one week at normal temperature, clogging occurred but the clogging was eliminated by cleaning.

C: When allowed to stand for three days at normal temperature, clogging occurred and the clogging was not eliminated even by cleaning.

Dispersion Stability

Each ink composition prepared above was diluted to 0.65 g/200 mL with pure water, and then the average particle diameter D50 of a dispersion pigment was measured with a particle size distribution meter "MicroTrac UPA" (manufactured by Nikkiso Co., Ltd.). Next, the ink composition prepared above was poured into an aluminum pack, and then stored at 40° C. for 30 days. The ink composition after the storage was diluted to 0.65 g/200 mL with pure water, and then the average particle diameter D50 of the dispersion pigment was measured with the particle size distribution meter. A difference between the average particle diameters D50 before and after the storage was calculated, and then the dispersion stability was evaluated in accordance with the following criteria. The results are shown in Tables 1 to 3. With respect to the dispersion stability, when the average particle diameter D50 difference is 40 nm or less, it can be said that good performance is obtained.

S: The average particle diameter D50 difference was 20 nm or less.

A: The average particle diameter D50 difference was more than 20 nm and 30 nm or less.

B: The average particle diameter D50 difference was more than 30 nm and 40 nm or less.

C: The average particle diameter D50 difference was more than 40 nm.

Production of Textile Printed Product Using Initial Ink Composition

Each ink composition prepared immediately after the preparation was caused to adhere to fabric by an ink jet method using a converted machine (having a fabric fixing unit so as to enable recording on fabric) of an ink jet printer (manufactured by Seiko Epson Corp., Product Name "PX-G930"). As the recording conditions, a solid pattern image was recorded with an adhesion amount of 15 mg/inch$^2$. Thus, ink jet textile printing was performed. Herein, the "solid pattern image" means an image in which dots were recorded to all the pixels, the pixel of which is the minimum recording unit region specified by the recording resolution.

Thereafter, heat treatment was performed at 160° C. for 1 minute using a heat press machine to thereby fix the ink composition to a target recording medium. Thus, a textile printed product in which an image was formed (ink was textile printed) on the target recording medium was manufactured.

Production of Textile Printed Product Using Ink Composition after Lapse of Time

A textile printed product was manufactured in the same manner as in the method described as an example in "Production of textile printed product using initial ink composition" above, except attaching each ink composition after stored at 40° C. for 30 days in place of each ink composition immediately after preparation.

Rubbing Fastness Performance

Each textile printed product was subjected to a wet rubbing fastness test of rubbing 200 times with a 200 g load using a Gakushin-type rubbing fastness tester AB-301S (Trade Name, manufactured by TESTER SANGYO CO., LTD.). The evaluation was performed based on Japanese Industrial Standards (JIS) JIS L 0849 confirming the ink peeling grade. The evaluation criteria are as follows. The results are shown in Tables 1 to 3. The "Initial wet rubbing fastness performance" in Tables 1 to 3 corresponds to the textile printed product using the initial ink composition and the "Wet rubbing fastness performance after lapse of time" corresponds to the textile printed product using the ink composition after the lapse of time. When the rubbing fastness performance is 3 grade or higher, it can be said that good performance is obtained.

Evaluation Criteria

S: Wet_4 grade or higher

A: Wet_3/4 grade

B: Wet_3 grade

C: Wet_2/3 grade or lower

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| Materials | Pigment | 4.5 | 4.5 | 4.5 | 4.5 | 4.5 | 4.5 | 4.5 | 4.5 | 4.5 | 4.5 | 4.5 | 4.5 | 4.5 |
| | Resin particles | 5.0 | 5.0 | 5.0 | 5.0 | 5.0 | 5.0 | 5.0 | 5.0 | 5.0 | 5.0 | 5.0 | 5.0 | 5.0 |
| | Specific crosslinking component | 2.0 | 2.0 | 1.5 | 1.5 | 1.0 | 1.0 | 2.0 | 2.0 | 2.0 | 2.0 | 2.0 | 2.0 | 2.0 |
| | Glycerol | 10.0 | 10.0 | 10.0 | 10.0 | 10.0 | 10.0 | 10.0 | 10.0 | 10.0 | 10.0 | 10.0 | 10.0 | 10.0 |
| | Ethylene glycol | 5.0 | 5.0 | 5.0 | 5.0 | 5.0 | 5.0 | 5.0 | 5.0 | 5.0 | 5.0 | 5.0 | 5.0 | 5.0 |
| | Surfactant | 2.0 | 2.0 | 2.0 | 2.0 | 2.0 | 2.0 | 2.0 | 2.0 | 2.0 | 2.0 | 2.0 | 2.0 | 2.0 |
| | TEA | 1.0 | 1.0 | 1.0 | 1.0 | 1.0 | 1.0 | 1.0 | 0.0 | 0.0 | 1.0 | 1.0 | 1.0 | 0.2 |
| | TIPA | 0.0 | 0.0 | 0.0 | 0.0 | 0.0 | 0.0 | 0.0 | 1.0 | 1.0 | 0.0 | 0.0 | 0.0 | 0.0 |
| | Triethylamine | 0.0 | 0.0 | 0.0 | 0.0 | 0.0 | 0.0 | 0.0 | 0.0 | 0.0 | 0.0 | 0.0 | 0.0 | 0.0 |
| | KOH | 0.00 | 0.00 | 0.00 | 0.00 | 0.00 | 0.00 | 0.00 | 0.05 | 0.05 | 0.05 | 0.00 | 0.00 | 0.05 | 0.00 |
| | Adipic acid | 0.10 | 0.08 | 0.10 | 0.07 | 0.09 | 0.05 | 0.08 | 0.12 | 0.00 | 0.03 | 0.00 | 0.12 | 0.08 |
| | Citric acid | 0.0 | 0.0 | 0.0 | 0.0 | 0.0 | 0.0 | 0.0 | 0.0 | 0.0 | 0.0 | 0.0 | 0.0 | 0.0 |
| | Tricarballylic acid | 0.0 | 0.0 | 0.0 | 0.0 | 0.0 | 0.0 | 0.0 | 0.0 | 0.0 | 0.0 | 0.0 | 0.0 | 0.0 |
| | Acetic acid | 0.00 | 0.00 | 0.00 | 0.00 | 0.00 | 0.00 | 0.00 | 0.00 | 0.12 | 0.00 | 0.08 | 0.00 | 0.00 |
| | HCl (35% aq) | 0.0 | 0.0 | 0.0 | 0.0 | 0.0 | 0.0 | 0.0 | 0.0 | 0.0 | 0.0 | 0.0 | 0.0 | 0.0 |
| | Water | Balance | Balance | Balance | Balance | Balance | Balance | Balance | Balance | Balance | Balance | Balance | Balance | Balance |
| Physical properties | pH | 7.8 | 8.3 | 7.8 | 8.3 | 7.8 | 8.3 | 9.3 | 7.9 | 8.5 | 9.4 | 8.5 | 7.9 | 7.5 |
| | Clogging performance | B | A | B | A | B | A | S | S | S | A | A | S | B |
| | Initial wet rubbing fastness performance | S | S | S | S | A | A | S | S | S | S | S | S | S |
| | Wet rubbing fastness performance after lapse of time | S | S | S | S | A | A | S | S | A | B | S | S | S |
| | Dispersion stability | S | S | S | S | S | S | S | S | S | A | A | S | S |

TABLE 2

| | | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|---|---|---|---|---|
| Materials | Pigment | 4.5 | 4.5 | 4.5 | 4.5 | 4.5 | 4.5 | 4.5 | 4.5 | 4.5 | 4.5 | 4.5 | 4.5 | 4.5 |
| | Resin particles | 5.0 | 5.0 | 5.0 | 5.0 | 5.0 | 5.0 | 5.0 | 5.0 | 5.0 | 5.0 | 5.0 | 5.0 | 5.0 |
| | Specific crosslinking component | 2.0 | 2.0 | 2.0 | 2.0 | 2.0 | 2.0 | 2.0 | 2.0 | 2.0 | 1.0 | 1.5 | 2.5 | 3.0 |
| | Glycerol | 10.0 | 10.0 | 10.0 | 10.0 | 10.0 | 10.0 | 10.0 | 10.0 | 10.0 | 10.0 | 10.0 | 10.0 | 10.0 |
| | Ethylene glycol | 5.0 | 5.0 | 5.0 | 5.0 | 5.0 | 5.0 | 5.0 | 5.0 | 5.0 | 5.0 | 5.0 | 5.0 | 5.0 |
| | Surfactant | 2.0 | 2.0 | 2.0 | 2.0 | 2.0 | 2.0 | 2.0 | 2.0 | 2.0 | 2.0 | 2.0 | 2.0 | 2.0 |
| | TEA | 0.5 | 1.5 | 1.7 | 0.0 | 0.0 | 1.0 | 1.0 | 1.0 | 1.0 | 1.0 | 1.0 | 1.0 | 1.0 |
| | TIPA | 0.0 | 0.0 | 0.0 | 1.0 | 0.0 | 0.0 | 0.0 | 0.0 | 0.0 | 0.0 | 0.0 | 0.0 | 0.0 |
| | Triethylamine | 0.0 | 0.0 | 0.0 | 0.0 | 1.0 | 0.0 | 0.0 | 0.0 | 0.0 | 0.0 | 0.0 | 0.0 | 0.0 |
| | KOH | 0.00 | 0.00 | 0.00 | 0.00 | 0.00 | 0.10 | 0.05 | 0.0 | 0.0 | 0.00 | 0.00 | 0.00 | 0.00 |
| | Adipic acid | 0.08 | 0.08 | 0.08 | 0.08 | 0.08 | 0.08 | 0.12 | 0.00 | 0.00 | 0.08 | 0.08 | 0.08 | 0.08 |
| | Citric acid | 0.0 | 0.0 | 0.0 | 0.0 | 0.0 | 0.0 | 0.0 | 0.08 | 0.00 | 0.0 | 0.0 | 0.0 | 0.0 |
| | Tricarballylic acid | 0.0 | 0.0 | 0.0 | 0.0 | 0.0 | 0.0 | 0.0 | 0.00 | 0.08 | 0.0 | 0.0 | 0.0 | 0.0 |
| | Acetic acid | 0.00 | 0.00 | 0.00 | 0.00 | 0.00 | 0.00 | 0.00 | 0.00 | 0.00 | 0.00 | 0.00 | 0.00 | 0.00 |
| | HCl (35% aq) | 0.0 | 0.0 | 0.0 | 0.0 | 0.0 | 0.0 | 0.05 | 0.00 | 0.00 | 0.0 | 0.0 | 0.0 | 0.0 |
| | Water | Balance | Balance | Balance | Balance | Balance | Balance | Balance | Balance | Balance | Balance | Balance | Balance | Balance |
| Physical properties | pH | 8.0 | 9.0 | 9.5 | 8.3 | 8.3 | 9.5 | 7.3 | 8.2 | 8.2 | 8.2 | 8.2 | 8.3 | 8.4 |
| | Clogging performance | A | A | A | A | A | S | S | A | A | S | A | A | B |
| | Initial wet rubbing fastness performance | S | S | S | S | S | S | S | S | S | A | S | S | S |
| | Wet rubbing fastness performance after lapse of time | S | A | B | S | S | A | B | A | A | A | S | S | S |
| | Dispersion stability | S | S | S | S | A | S | C | A | A | S | S | S | A |

TABLE 3

| | | Comp. Ex. 1 | Comp. Ex. 2 | Comp. Ex. 3 | Comp. Ex. 4 | Comp. Ex. 5 |
|---|---|---|---|---|---|---|
| Materials | Pigment | 4.5 | 4.5 | 4.5 | 4.5 | 4.5 |
| | Resin particles | 5.0 | 5.0 | 5.0 | 5.0 | 5.0 |
| | Specific crosslinking component | 2.0 | 0.5 | 0.0 | 2.0 | 2.0 |
| | Glycerol | 10.0 | 10.0 | 10.0 | 10.0 | 10.0 |
| | Ethylene glycol | 5.0 | 5.0 | 5.0 | 5.0 | 5.0 |
| | Surfactant | 2.0 | 2.0 | 2.0 | 2.0 | 2.0 |
| | TEA | 1.0 | 1.0 | 1.0 | 0.0 | 1.0 |
| | TIPA | 0.0 | 0.0 | 0.0 | 0.0 | 0.0 |
| | Triethylamine | 0.0 | 0.0 | 0.0 | 0.0 | 0.0 |
| | KOH | 1.50 | 0.0 | 0.00 | 0.00 | 0.00 |
| | Adipic acid | 0.00 | 0.0 | 0.12 | 0.12 | 0.00 |
| | Citric acid | 0.0 | 0.0 | 0.0 | 0.0 | 0.0 |
| | Tricarballylic acid | 0.0 | 0.0 | 0.0 | 0.0 | 0.0 |
| | Acetic acid | 0.0 | 0.0 | 0.0 | 0.0 | 0.0 |
| | HCl (35% aq) | 0.00 | 0.00 | 0.00 | 0.00 | 0.00 |
| | Water | Balance | Balance | Balance | Balance | Balance |
| Physical properties | pH | 9.8 | 8.7 | 7.8 | 7.8 | 9.5 |
| | Clogging performance | S | S | A | C | A |
| | Initial wet rubbing fastness performance | S | B | C | S | S |
| | Wet rubbing fastness performance after lapse of time | C | C | C | S | C |
| | Dispersion stability | S | S | S | S | A |

In Examples, when the clogging performance and the wet rubbing fastness performance in the initial stage and after the lapse of time are all evaluated to be B or higher, it can be said that both an improvement of the fastness performance in the initial stage and after the lapse of time and an improvement of the clogging performance are satisfied, so that the effects of the invention are demonstrated.

Hereinafter, the results of Examples and Comparative Examples are examined, but the invention is not limited at all by the following examinations.

It is found from Examples and Comparative Examples that, by providing the configuration according to an aspect of the invention, both an improvement of the fastness performance in the initial stage and after the lapse of time and an improvement of the clogging performance can be satisfied. With this configuration, the crosslinking component having a blocked isocyanate group particularly improves the rubbing fastness, the tertiary amine particularly improves the clogging performance (particularly, originating from the ease of drying of a nozzle and ease of precipitation of a solid when drying progresses), which sometimes decreases by the incorporation of the crosslinking component having a blocked isocyanate group, by suppressing drying, and the at least one carboxylic acid selected from the group consisting of monocarboxylic acid, dicarboxylic acid, and tricarboxylic acid particularly suppresses the decomposition (particularly, decomposition by the tertiary amine) of the crosslinking component having a blocked isocyanate group, whereby good rubbing fastness can be maintained also by the ink composition after the lapse of time.

In particular, Examples 7, 8, 12, and 19 show that, by the incorporation of the inorganic base, the clogging performance is further improved than that in Examples 1 and 2 not containing the inorganic base.

In particular, Examples 25 and 26 show that, when the content of the crosslinking component having a blocked isocyanate group is 2.5% by mass or less based on the entire ink composition, the clogging performance and the dispersion stability can be improved.

In particular, Examples 2, 17, and 18 show that, when the tertiary amine is alkanolamine, the dispersion stability is further improved.

In particular, Examples 13 and 14 show that, when the content of the tertiary amine is 0.5% by mass or more based on the entire ink composition, the clogging performance is further improved. Moreover, Examples 15 and 16 particularly show that, when the content of the tertiary amine is 1.5% by mass or less based on the entire ink composition, the wet rubbing fastness performance after the lapse of time is further improved. It is presumed that the reason therefor lies in, when the content of the tertiary amine is 1.5% by mass or less, the decomposition of the crosslinking component, which has a blocked isocyanate group, being suppressed.

In particular, Examples 2, 11, 21, and 22 show that, when the carboxylic acid has a pKa value of 4.0 or more, the wet rubbing fastness performance after the lapse of time is further improved. This is because the decomposition of the crosslinking component having a blocked isocyanate group is favorably suppressed when the carboxylic acid has a pKa value of 4.0 or more.

Moreover, in particular, Examples 2 and 11 show that, when the carboxylic acid is dicarboxylic acid, the dispersion stability is more excellent.

In particular, Examples 6 and 10 show that, when the content of the carboxylic acid is 0.05% by mass or more based on the entire ink composition, the dispersion stability or the wet rubbing fastness performance after the lapse of time is further improved.

Moreover, Example 20 and other Examples (for example, Example 13) show that, when the pH of the ink composition is 7.5 or more and 9.5 or less, the decomposition of the crosslinking component having a blocked isocyanate group does not easily progress, the fastness performance in the initial stage and after the lapse of time is favorably maintained, and the dispersion stability is also improved in the ink composition according to an aspect of the invention.

The entire disclosure of Japanese Patent Application No. 2017-065773, filed Mar. 29, 2017 is expressly incorporated by reference herein.

What is claimed is:

1. An ink jet ink composition for textile printing comprising:

a crosslinking component having a blocked isocyanate group;

tertiary amine;

adipic acid;

a pigment; and water.

2. The ink jet ink composition for textile printing according to claim 1, further comprising resin particles.

3. The ink jet ink composition for textile printing according to claim 1, further comprising an inorganic base.

4. The ink jet ink composition for textile printing according to claim 3, wherein the inorganic base is potassium hydroxide.

5. The ink jet ink composition for textile printing according to claim 3, wherein a content of the inorganic base is 0.01% by mass or more and 0.1% by mass or less based on the ink composition.

6. The ink jet ink composition for textile printing according to claim 1, wherein a content of the crosslinking component is 1.0% by mass or more and 2.5% by mass or less based on the ink composition.

7. The ink jet ink composition for textile printing according to claim 1, wherein the tertiary amine is alkanolamine.

8. The ink jet ink composition for textile printing according to claim 1, wherein a content of the tertiary amine is 0.5% by mass or more and 1.5% by mass or less based on the ink composition.

9. The ink jet ink composition for textile printing according to claim 1, wherein the adipic acid has a pKa value of 4.0 or more.

10. The ink jet ink composition for textile printing according to claim 1, wherein a content of the adipic acid is 0.05% by mass or more and 0.15% by mass or less based on the ink composition.

11. The ink jet ink composition for textile printing according to claim 1, wherein a pH of the ink jet ink composition is 7.5 or more and 9.5 or less.

12. The ink jet ink composition for textile printing according to claim 1, wherein the crosslinking component is a low molecular weight crosslinking component.

13. An ink jet textile printing method comprising discharging the ink jet ink composition for textile printing according to claim 1 from an ink jet apparatus to cause the ink jet ink composition for textile printing to adhere to a target recording medium containing at least fabric.

14. An ink jet textile printing method comprising discharging the ink jet ink composition for textile printing according to claim 2 from an ink jet apparatus to cause the ink jet ink composition for textile printing to adhere to a target recording medium containing at least fabric.

15. An ink jet textile printing method comprising discharging the ink jet ink composition for textile printing according to claim 3 from an ink jet apparatus to cause the ink jet ink composition for textile printing to adhere to a target recording medium containing at least fabric.

16. An ink jet textile printing method comprising discharging the ink jet ink composition for textile printing according to claim 4 from an ink jet apparatus to cause the ink jet ink composition for textile printing to adhere to a target recording medium containing at least fabric.

17. An ink jet textile printing method comprising discharging the ink jet ink composition for textile printing according to claim 5 from an ink jet apparatus to cause the ink jet ink composition for textile printing to adhere to a target recording medium containing at least fabric.

18. An ink jet textile printing method comprising discharging the ink jet ink composition for textile printing according to claim 6 from an ink jet apparatus to cause the ink jet ink composition for textile printing to adhere to a target recording medium containing at least fabric.

19. An ink jet textile printing method comprising discharging the ink jet ink composition for textile printing according to claim 7 from an ink jet apparatus to cause the ink jet ink composition for textile printing to adhere to a target recording medium containing at least fabric.

* * * * *